Dec. 4, 1956  A. C. RIPKE  2,772,571

DEVICE FOR TRANSMITTING ROTARY MOTION

Filed Jan. 4, 1955

Inventor

AUGUST C. RIPKE by *Irwin Haskitt*
Attorney

United States Patent Office 2,772,571
Patented Dec. 4, 1956

2,772,571

DEVICE FOR TRANSMITTING ROTARY MOTION

August C. Ripke, Austin, Minn.

Application January 4, 1955, Serial No. 479,751

5 Claims. (Cl. 74—63)

This invention relates to improvements in a device for transmitting rotary motion, and appertains particularly to one wherein a wheel driven in a circular course motivates an endless shaft-and-gear train arranged in a circle surrounding the axis of such wheel's circular course.

The object of the invention is to provide a novel mechanical device for transmitting rotary motion from a driven shaft to a rolling shaft-and-gear train lying concentrically to and in a plane at right angles to the axis of said driven shaft.

A further object of the invention is to provide a simple device for transmitting rotary motion as described wherein the power is communicated from the driving to the driven element through the low-friction engagement of a rolling wheel riding on progressively spaced, rotatably mounted vanes arranged in a circle.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Figure 1:
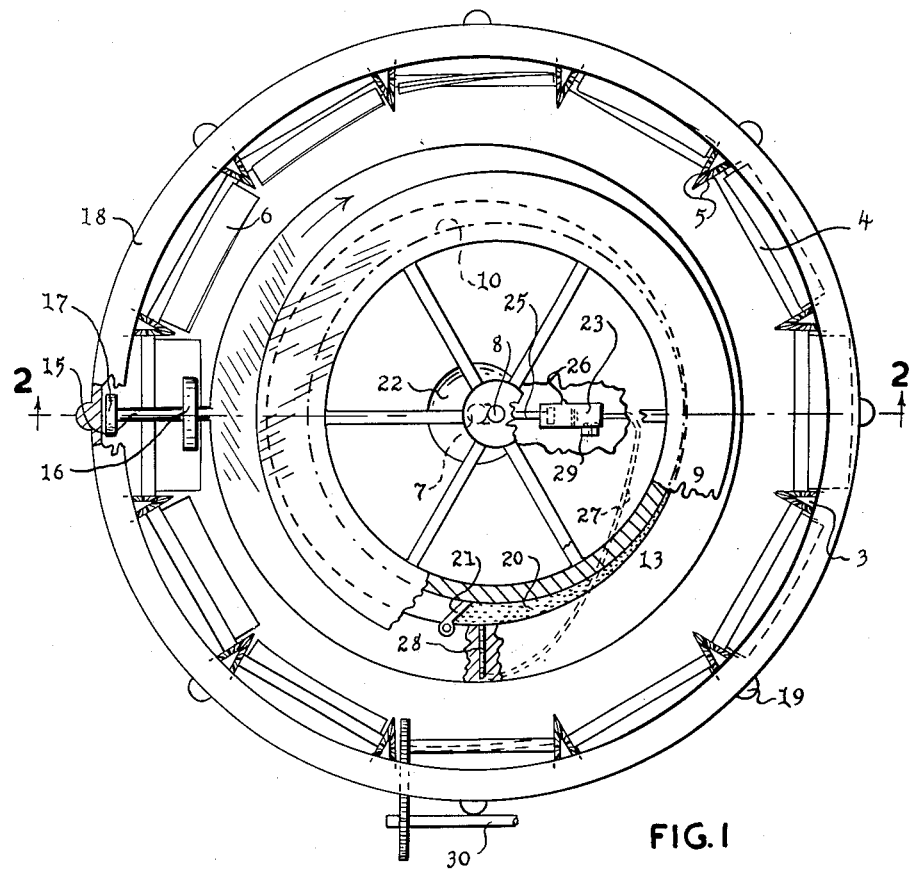
Figure 1 is a plan view of a preferred embodiment of the invention.
Figure 2:
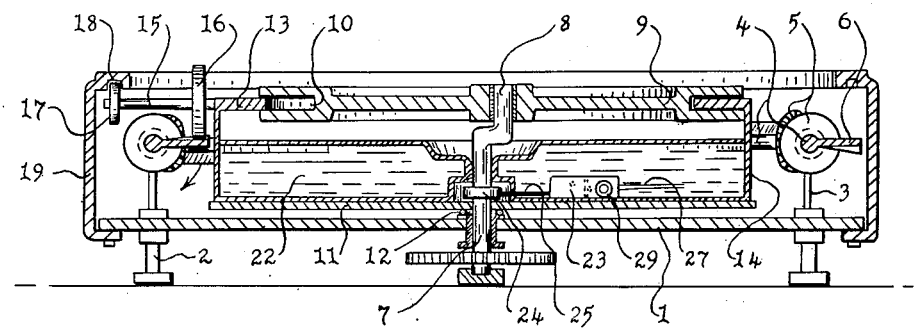
Figure 2 is a transverse vertical section thereof, as taken on line 2—2 of Figure 1.

Briefly, the herein disclosed transmitter of rotary motion, useable in advertising display apparatus, amusement devices and a wide variety of comparable motion transforming and power transmitting structures, utilizes a freely rotatable wheel mounted on the upper crank end of a driven vertical shaft with a ring designed to be held concentric with said shaft yet seating eccentrically in a circumferential channel in said wheel and carrying a rolling wheel on a radially extending shaft that rides on a circular track comprising a series of relatively flat vanes radiating in progressive rotative positions from gear connected shafts arranged in an endless shaft-and-gear train circle and designed to rotate continuously under pressure of the said rolling wheel.

The platform 1 is of circular form and raised off the supporting surface by legs 2. A plurality of spaced bearing standards 3 rotatably support the ends of horizontal shafts 4 that deflect at 30 degrees from axial alignment and on the adjoining ends of said shafts are meshing miter gears 5 so that twelve such gear connected shafts provide an endless and substantially circular shaft-and-gear train.

From each shaft 4 an elongated vane or wing 6 projects radially and while substantially flat is preferably provided with a slight twist which together with arranging of successive vanes in progress relative rotative positions imparts a helical form to the complete series of such vanes.

A rotatable shaft 7 that may be driven from any suitable source has a crank arm 8 on its upper end. Freely rotating on the crank arm 8 is a wheel 9 with a deep circumferential channel 10 in its rim. Also freely rotatable on main length of the shaft 7 is a circular plate 11 that is preferably supported just above the platform 1 and may ride on roller bearings 12.

A relatively wide thin ring 13 seats eccentrically in the wheel's rim channel 10, being connected by vertical spokes 14 with the periphery of the circular plate 11 and thus retained in a position concentric with the main length of the shaft 7. A stub shaft 15 projects from the circumference of the ring and carries a rotatable wheel 16 that rolls on the vanes 6 making up the sectional helix and, outwardly of the wheel 16, a roller 17 that bears upwards against an over-head track 18 that is supported by spaced posts 19 from the platform 1.

To cause the ring 13 to turn as its crank carried wheel is actuated, a body of oil or similar liquid 20 is trapped in the wheel rim channel by the snug fitting ring and a gate valve 21 hinged to its inner circumference and swingable under pressure of the oil against the base of the channel so that as the crank turns, the wheel tends to run around on the inside of the ring squeezing the oil body so that it continually and evenly presses forwards against the rear of the gate.

This body of oil 20 in the channel 10 is maintained under constant volume and pressure from an oil reservoir 22 on the plate 11 by a pump 23 located in the reservoir and designed to be immersed in the oil supply. The pump is actuated from a cam 24 on the shaft 7 by a stem 25. The pump has an inlet 26 and a feed line 27 leading by one of the spokes 14 to a bore 28 in the ring 13 that leads to the inner circumference of the ring just behind the gate valve 21. A pressure control escape port 29 in the pump permits the discharge of oil back into the reservoir 22 except when the body of oil in the wheel channel 10 needs replenishing.

In use, when the shaft 7 is driven, the wheel 9 on the upper crank end rolls around in its eccentric course driving the ring 13 through the medium of the oil body 20 so that the rolling wheel 16 runs on the inclined upper surface of successive vanes 6 depressing each as it passes to rotate the carrying gear shaft through an angle of approximately 30°. Thus in describing one complete circle the wheel 16 will cause the vane-composed sectional helix to make one complete revolution.

If desired, a driven shaft 30 may be geared to one of the train shafts 4.

From the foregoing description taken in connection with the accompanying drawings, it will be manifest that a smooth running device for transmitting rotary motion of a vertical shaft to a surrounding endless sectional helix is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. A device for transmitting rotary motion comprising a driven vertical shaft having a crank, a wheel rotatable on the crank of said shaft, and an endless track concentric with said shaft comprising a series of vanes projecting radially from gear-connected shafts arranged in an endless shaft-and-gear train, with the successive vanes in progressive relative rotatable position to provide a sectionalized helix; said endless sectionalized helix track being actuated by the eccentric travel of said crank carried wheel.

2. A device for transmitting rotary motion comprising a driven vertical shaft, mechanism actuated by said shaft including a horizontal radially extending stub shaft with a wheel rotatable thereon, and a surrounding track on which the wheel of said mechanism has running engagement comprising a series of vanes projecting radially from gear connected shafts arranged in an endless shaft-and-gear train, with the successive vanes in progressive relative rotative position to provide a sectionalized helix.

3. The combination with the structure set forth in claim 2, wherein the vanes have a twist formation contributing to the helical structure of the track.

4. A device for transmitting rotary motion comprising a driven vertical shaft having a crank, a wheel with a circumferentially channeled rim rotatable on the crank of said shaft, a ring disposed concentric with said shaft and seating eccentrically in the channeled rim of said wheel, propelling means between the base of the wheel rim channel and the inner circumference of said ring, a stub shaft extending radially from said ring with a wheel rotatably mounted thereon, a track surrounding the aforementioned mechanism on which said wheel on said stub shaft has running engagement comprising a series of vanes projecting radially from gear connected shafts arranged in an endless shaft-and-gear train, with the successive vanes in progressive relative rotative position to provide a sectionalized helix.

5. The combination with the structure set forth in claim 4, of a roller also rotatably mounted on said stub shaft exterior of said wheel thereon, and an overhead type track, disposed above, concentric with and exterior of said sectionalized helix, on the underside of which said roller is designed to run.

References Cited in the file of this patent
UNITED STATES PATENTS
2,590,287    Brelsford _____ Mar. 25, 1952